UNITED STATES PATENT OFFICE.

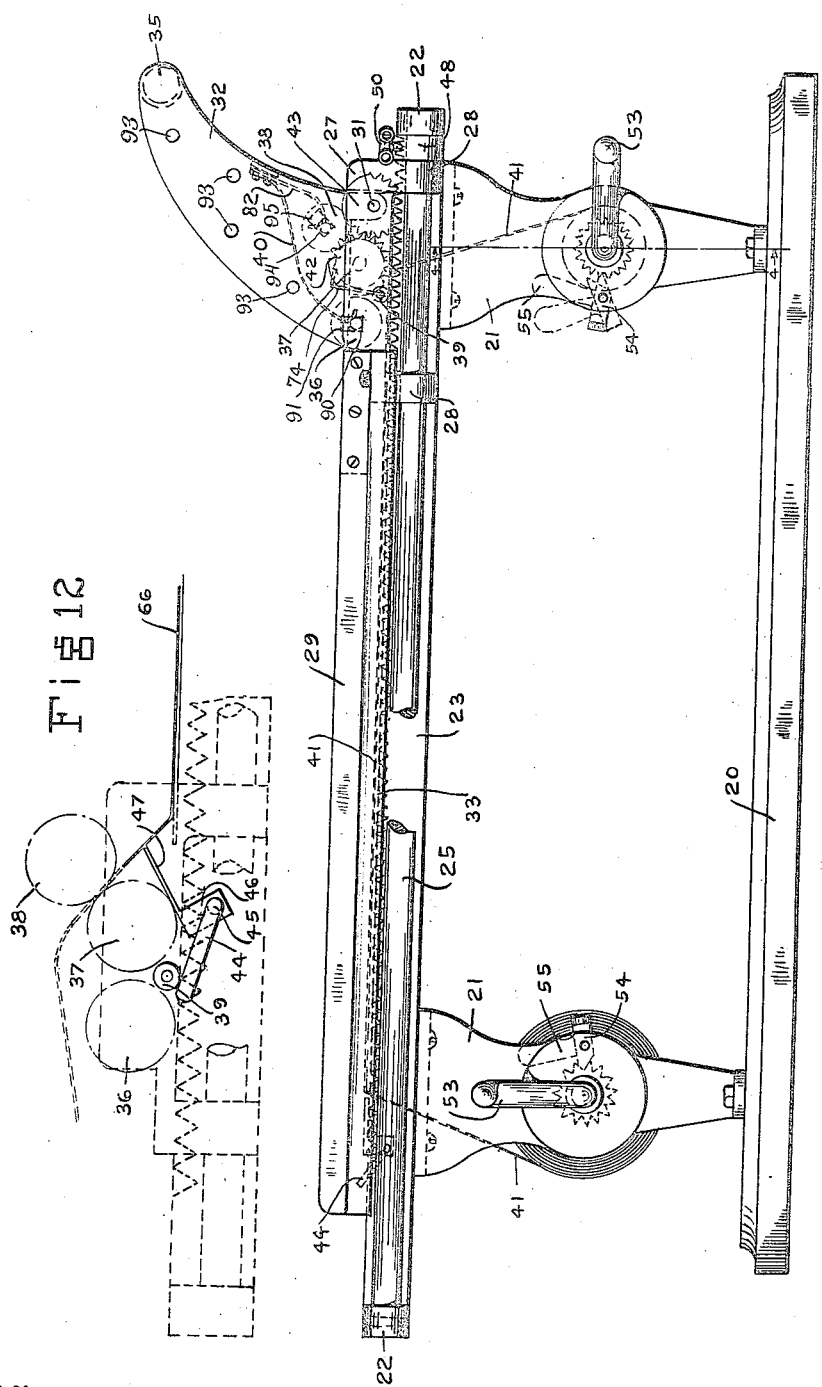

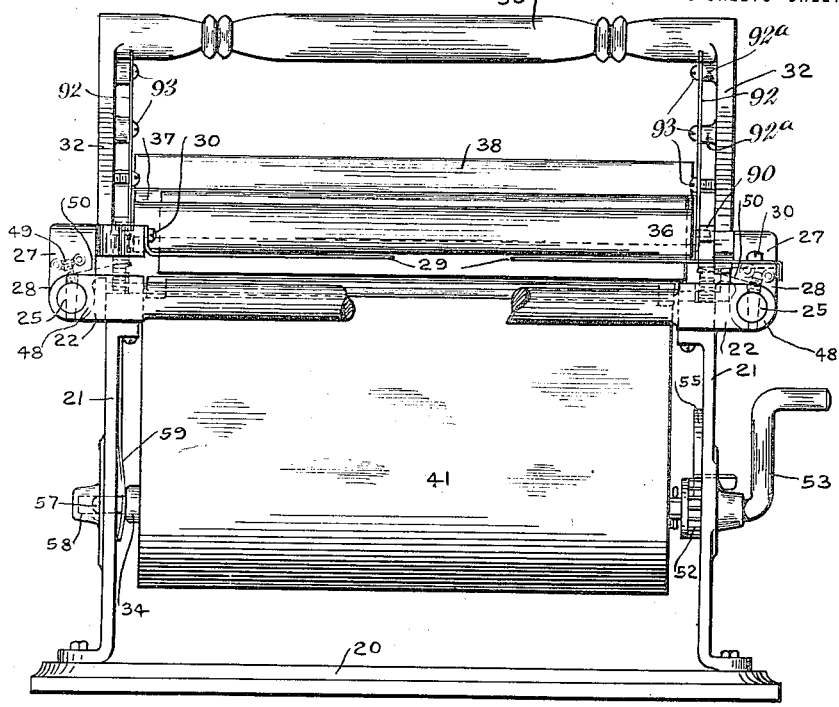
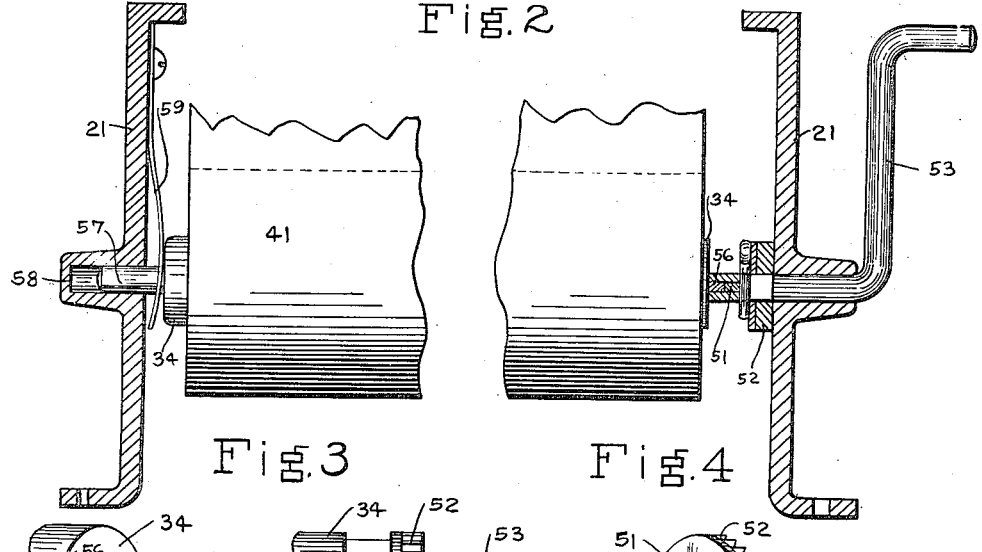
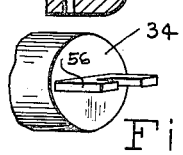
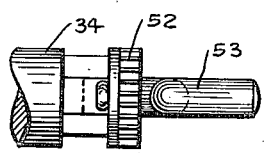
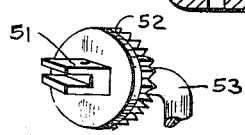

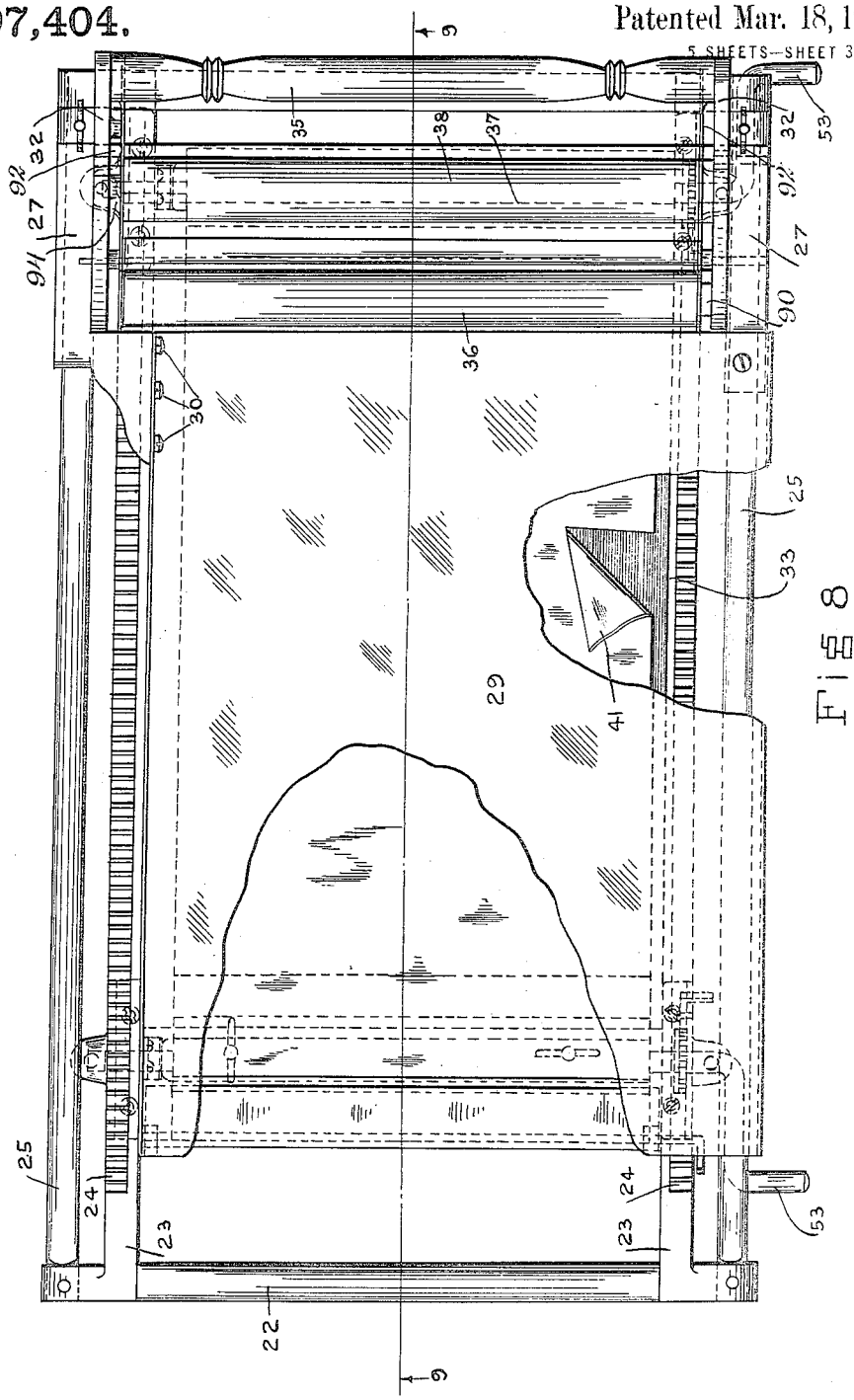

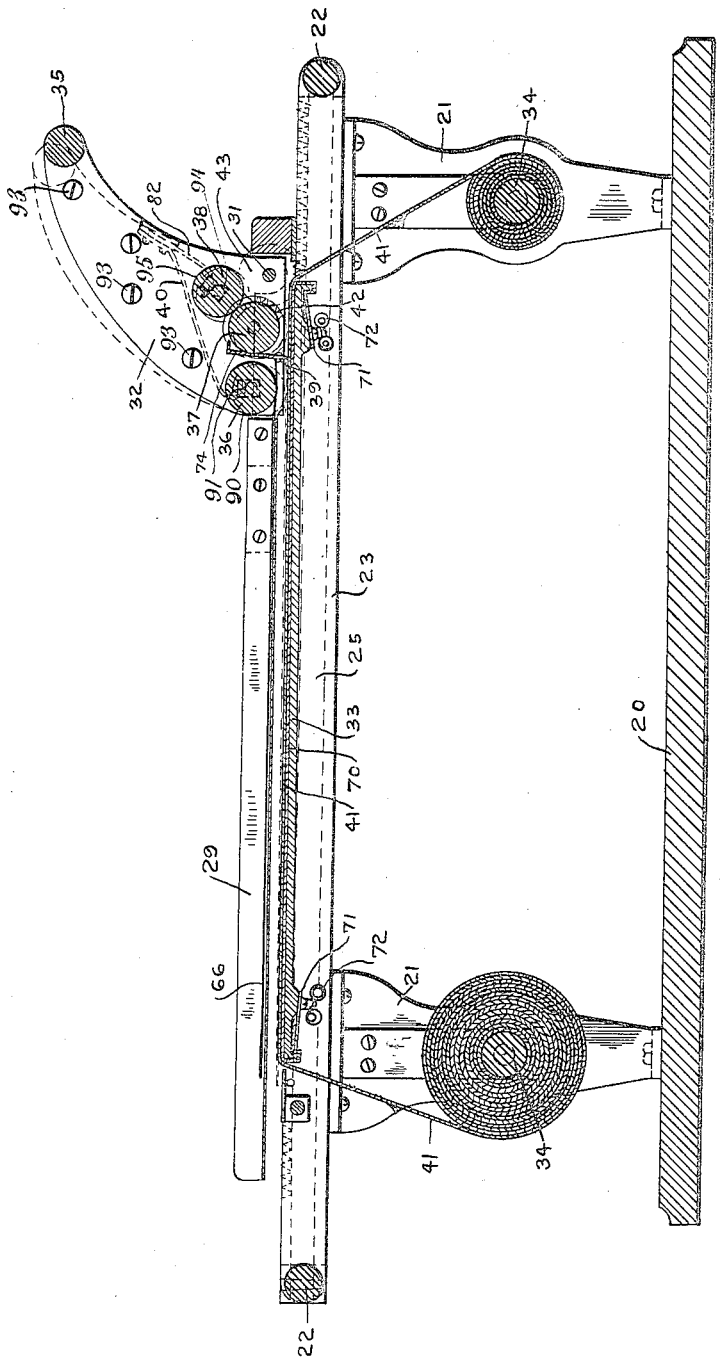

ALOIS BENJAMIN SALIGER, OF NEW YORK, N. Y., ASSIGNOR, BY MESNE ASSIGNMENTS, TO THE BECK DUPLICATOR COMPANY, A CORPORATION OF NEW YORK.

DUPLICATOR.

1,297,404.  Specification of Letters Patent.  Patented Mar. 18, 1919.

Application filed April 20, 1915. Serial No. 22,561.

*To all whom it may concern:*

Be it known that I, ALOIS BENJAMIN SALIGER, a citizen of the United States, and a resident of the borough of Manhattan, city and State of New York, have invented certain new and useful Improvements in Duplicators, of which the following is a specification.

The invention relates to duplicators, and more particularly to the type of such machines provided with a duplicating surface, usually composed of a gelatinous compound, adapted to receive negative or reversed impressions, and rolling means for pressing a sheet of paper or the like thereupon to communicate such an impression or to receive same therefrom as the case may be.

One of the principal objects of the invention is to provide a machine of the type mentioned in which the operation of placing the paper in contact with the surface, taking the impression, and removing the paper, may be performed efficiently, quickly and easily.

The invention consists in the novel construction, arrangement and combination of various devices, elements and parts as shown in the accompanying drawings, and hereinafter more particularly described.

Figure 10:
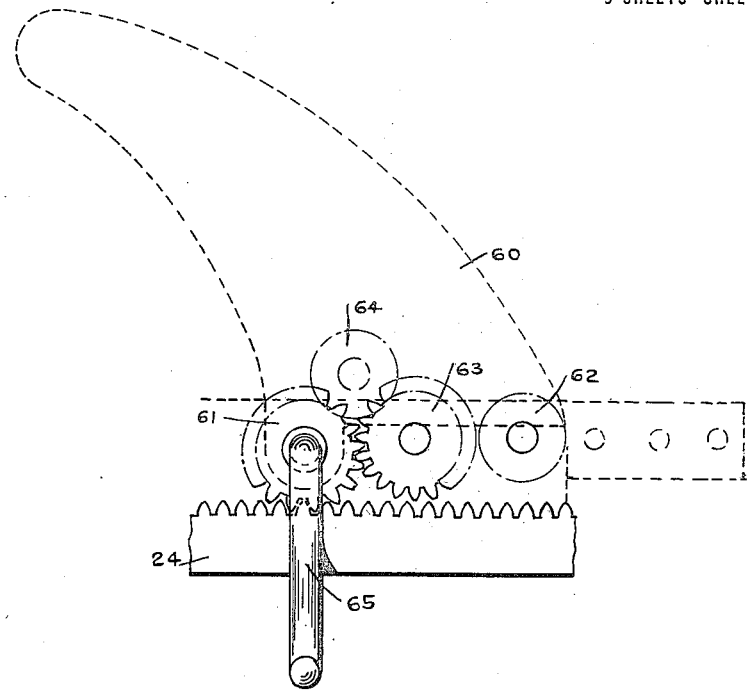
Figure 11:
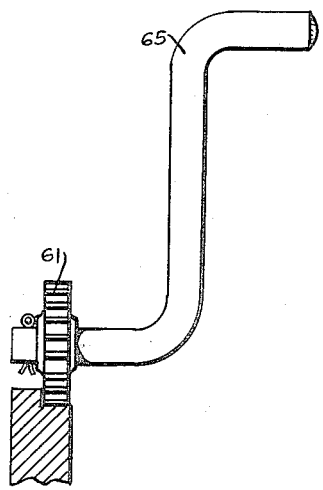

In the said drawings, Figure 1 is a side elevation of a duplicator constructed according to my invention; Fig. 2 is an end view of the same, looking from the left of Fig. 1; Figs. 3 to 7 inclusive are views showing details of the roll for the duplicating film and the means for securing and operating the same, as hereinafter described; Fig. 8 is a plan view; Fig. 9 is a longitudinal vertical section taken on the line 9—9 of Fig. 8; Figs. 10 and 11 are diagrammatic views illustrating a modified form of the invention in which a crank and gear-wheel are employed to operate the impression roller, as hereinafter described, and Fig. 12 is a diagrammatic view showing in detail means for elevating an edge of a sheet of paper when in the duplicator, as hereinafter described.

In carrying my invention into effect in the forms thereof which I have selected for description and illustration in this application, and referring now to the form in which the carriage or frame in which are journaled the impression and stripping rollers is moved directly by hand, rather than by a crank and gear as will be hereinafter described, and viewing now more particularly Figs. 1, 8 and 9 I provide a base 20, to which are secured uprights 21 upon which is supported a frame comprising end members 22, inner side members 23 which are provided with racks 24, and outer side members 25, preferably in the form of cylindrical rods. The inner side members 23 may if desired be integral with the end members 22, the latter being provided in their ends, which project beyond the inner side members 23, with sockets adapted to receive the rods 25, which may slide in said sockets but which may when desired be secured against such sliding by pins or similar means. This construction is provided in order that the rods 25 may be partially or entirely removed from the frame in order to assemble or disassemble the movable frame or carriage, hereafter to be described, from the remainder of the apparatus.

Extending across between the inner side members 23 is a bed 33, over which the duplicating film 41 passes the portion not in use being wound upon rolls 34, journaled in the uprights 21, the detailed construction and means for operating of which will be hereafter described. I prefer to interpose between the bed 33 and the duplicating film 41 a strip of suitable fabric 70, the ends of which are passed around the ends of the bed and secured underneath the same by plates 71 which are held by wing-screws 72.

The movable frame or carriage above referred to will be best seen in elevation in Figs. 1 and 9, and in plan in Fig. 8. In the form shown in the drawings it comprises four principal parts—a frame proper, a swinging operating handle, a paper platform extending out over the apparatus, and impression and stripping rollers, though the platform is not essential and may be dispensed with if desired. The frame proper is formed of a pair of side members 27, provided with downwardly extending lugs 28, perforated so as to adapt them to slide upon the rods 25 (see Fig. 2). One end of the platform 29 is secured to the side members 27 by screws 30 (see Fig. 2) and the remainder of the platform, which may be constructed of sheet metal or such material, extends out as shown in Figs. 1, 8 and 9. Pivotally secured at 31 to the side members 27 is the operating handle 32, in the lower part of which are journaled the impression and stripping rollers for depressing upon the duplicating medium a sheet of paper or the like and for stripping the same therefrom, and the upper part of which handle comprises a cross bar 35 by which the carriage may be moved to and fro. A paper stop 74 secured to the members 27 is provided to prevent the paper when inserted in the apparatus from passing in too far.

The location and construction of the impression and stripping rollers will now be described. Referring more particularly to Fig. 9, 36 is the impression roller, 37 and 38 are the stripping rollers, and 39 is a small auxiliary roller for operating the means, hereafter to be described, for elevating an edge of the paper preparatory to stripping the same from the duplicating medium. The roller 36 is journaled in blocks 90, the outer ends of which may rest against the sides of the members 32. These blocks 90 slide in vertical slots 91 in plates 92, and are pressed downward by springs 40. These plates 92 rest against inwardly extending lugs 92$^a$ integral with the members 32, and are secured thereto by means of screws 93. Toward the right of Fig. 9 are the stripping rollers 37 and 38, mounted in the plate 92 in a manner similar to the roller 36. No slots are provided for the roller 37, but the block 94 holding the ends of the roller 38 slide in slots 95, and the roller 38 is pressed against the roller 37 by means of springs 82 acting on the blocks 94. It will be seen that by this construction the assembling of the impression and stripping rollers in the frame is greatly facilitated. The roller 37 is provided at its end with a gear wheel 42 (best shown in Fig. 1) meshing with a gear wheel 43 on the pivot 31, this gear wheel 43 meshing in turn with the rack 24. It is obvious that the device termed the impression roller 36, need not necessarily be a rotatable device, as a non-rotatable or "scraping" device would answer the same purpose.

To the left of Fig. 1 I provide a device, shown diagrammatically and on a larger scale in Fig. 12, adapted to lift the edge of the paper after it has received its impression, so that it may pass between the stripping rollers 37 and 38. This device comprises a finger 44, adapted to be depressed by the roller 39 as the carriage is moved thereover. This finger 44 is pivoted in the main frame at 45. Also pivoted at 45, and rigidly attached to the finger 44, is an arm 46 having integral therewith a strip 47 passing across the width of the duplicator. The other end of the strip 47 may be integral with an arm similar to 46, pivoted in the same manner as 45, although it is obvious that the roller 39 and finger 44 need not be duplicated.

In order to adapt the apparatus for use with sheets of paper of different sizes, it is desirable to provide means for limiting the backward motion of the carriage and its rollers, or in other words, for fixing the point from which the forward motion will begin, so that the end of the paper which is last depressed by the impression roller may always be in operative relation to the edge elevating device above described. For this purpose I provide the adjustable stops 48. These consist of sleeves surrounding the rods 25 slidable and revoluble thereon but capable of being fixed at any desired point by means of set screws 49. Extending laterally from these sleeves 48 and integral therewith are arms 50, having ends adapted to engage with the teeth of the rack 24, whereby the stops 48 may be easily and quickly spaced at any desired point upon the rods 25.

The detailed construction of the rollers 34 will now be described, referring particularly to Figs. 3 to 7 inclusive. Mounted in one of the frames 21 are sockets 51, of the form shown. Integral with these sockets are the ratchet wheels 52, and the cranks 53 by which the same are rotated. Co-acting with each ratchet is a pawl 54 mounted on the frame 21, and provided with an operating lever 55. The rollers 34 are provided at one end with a projection 56 adapted to engage with the socket 51, and at the other end with a pin 57, adapted to rotatably fit in a socket 58 in the other member 21. A spring 59 attached to the member 21 holds the roller 34 securely in engagement with the socket 51 (see Fig. 3).

In the modification shown in Figs. 10 and 11, I provide a frame, bed, duplicating surface, &c., similar to analogous parts described above, and a carriage comprising members 60 analogous to the members 32, and rollers 62, 63 and 64, analogous respectively to the rollers 36, 37 and 38. I provide a gear wheel 61, analogous to the wheel 43. This gear wheel 61 meshes with teeth on the end of the roller 63, and also meshes with the rack 24. A crank 65 is provided, by which the gear wheel 61 may be operated. This modification is intended for use on large machines, which are too heavy to be conveniently operated by means of the handle 35, its operation differs in no way from that of the form first described, except that the crank 65 is used to operate, instead of the handle 35, thus securing a gain in leverage.

The assembling and operation of a duplicator embodying my invention is as follows:

The end of the strip of duplicating material 41 is suitably secured to one of the rollers 34, wound thereupon, and the other end secured to the other roller 34. These rollers are inserted by pressing the pin 57 into the socket 58 against the tension of the spring 59, until the projection 56 may be made to engage with the socket 51, the roller being then held between the members 21. When it is desired to remove one of the rollers, it is pressed toward the left of Figs. 3 and 4, until the projection 56 is disengaged from the socket 51, when the roller may be lifted clear of the frame.

The duplicating medium passes from one roller 34 over the bed 33 to the other roller 34. It is tightened by turning the cranks 53, moving the ratchets 52, which are engaged by the pawls 54. These pawls can be moved out of engagement with their ratchets by operating the levers 55. One of the pawls is held out of engagement when it is desired to roll the duplicating medium from one roller to the other for the purpose of exposing a fresh portion for use.

The duplicating medium being properly in position, a negative or reversed impression of the matter which it is desired to copy, may be transferred thereto in the usual manner.

A sheet of paper 66 on which it is desired to make a copy is placed in position on the operating portion 29 of the carriage. The operating handle is pulled backward and downward, so that the members 32 will occupy the position shown by the full lines in Fig. 9, and the impression roller 36 will be raised above the duplicating surface, which allows the end of the paper to be slid thereunder, until the end rests against the stop 74.

The handle 35 is moved toward the left of Fig. 9. The first result of this is to cause the members 32 to swing forward on their pivots 31, and assume the position shown by the dotted lines in Fig. 9, causing the impression roller to descend upon the paper and force the end of the same down and into contact with the duplicating medium, this depression of the paper causing the edge to clear the stop 74. As the movement of the handle 35 continues, the entire carriage moves toward the left of Fig. 9, the table 29 sliding out from under the paper 66, more and more of which is successively brought into contact with the duplicating medium 41, until the entire paper has been passed over by the impression roller.

At the end of the leftward movement of the carriage, the roller 39 passes over and depresses the finger 44, raising the strip 47, which in turn elevates the end of the paper, so that as the carriage is moved back toward the right, the paper will pass out between the stripping rollers 37 and 38 (see Fig. 12) more and more paper being successively stripped from the duplicating medium as the rightward movement of the carriage is continued, until the carriage has reached its original position, and the entire sheet of paper has passed through the stripping rollers. If desired a stop may be provided to limit the leftward movement of the carriage, in order that the roller 39 may not pass entirely over the finger 44.

A new sheet of paper is then placed in position, and the operation repeated, in this manner as many copies as desired may be taken, and the crank 53 then operated so as to bring into position a fresh portion of the duplicating strip adapted to receive a new negative impression.

The stop 48 should be so set that the end of the paper used will pass just beyond the strip 47. This stop 48 is adjusted by loosening the set screw 49, partially rotating it so as to disengage the arm 50 from the rack, and sliding it along the rod 25 to any point desired, whereupon the arm 50 is depressed upon the rack 24, and the set screw 49 tightened.

The advantages of my invention will be obvious from what has been said concerning its construction and mode of operation.

Having thus described my invention, what I claim as new and desire to secure by Letters Patent is as follows:

1. In a duplicator, the combination with a frame having a bed, and a duplicating film thereon; of a carriage slidably mounted on said frame and provided with a stop rigidly secured thereto and adapted to limit the longitudinal movement of a sheet of paper and with means adapted to depress a sheet of paper or the like on to said duplicating film.

2. In a duplicator, the combination with a frame having a bed, and a duplicating film thereon; of a carriage slidably mounted on said frame and provided with a stop rigidly secured thereto and adapted to limit the longitudinal movement of a sheet of paper and provided with means adapted to depress a sheet of paper or the like on to said duplicating film and to be raised above said bed, thereby leaving a space into which may be inserted the end of such sheet of paper.

3. In a duplicator, the combination with a frame having a bed, and a duplicating film thereon; of a carriage slidably mounted on said frame, said carriage comprising rocking members, means borne by said rocking members adapted to depress a sheet of paper or the like on to said duplicating film, and a stop rigidly secured to said carriage and adapted to limit the longitudinal movement of said paper.

4. In a duplicator, the combination with a frame having a bed, and a duplicating film thereon; of a carriage slidably mounted on said frame and provided with a stop rigidly secured thereto and adapted to limit the longitudinal movement of a sheet of paper, and with means adapted to depress such sheet of paper on to said duplicating film; and an adjustable stop on said frame adapted to limit the movement of said carriage.

5. In a duplicator, the combination with a frame having a bed, and a duplicating film thereon; of a carriage slidably mounted on said frame and provided with means adapted to depress a sheet of paper on to said duplicating film and an adjustable stop on said frame adapted to limit the movement of said carriage, said adjustable stop comprising a sleeve, a rod, a set screw in said sleeve, and an arm on said sleeve adapted to engage with a rack on said frame.

6. In a duplicator, the combination with a frame having a bed, and a duplicating film thereon; of a carriage slidably mounted on said frame and provided with a stop rigidly secured thereto and adapted to limit the longitudinal movement of a sheet of paper and with means adapted to depress a sheet of paper or the like on to said duplicating film, and means adapted to strip such sheet of paper from said duplicating film.

7. In a duplicator, the combination with a frame having a bed, and a duplicating film thereon; of a carriage slidably mounted on said frame and provided with a stop rigidly secured thereto and adapted to limit the longitudinal movement of a sheet of paper and provided with means adapted to depress a sheet of paper or the like on to said duplicating film and to be raised above said bed, thereby leaving a space into which may be inserted the end of such sheet of paper, and means adapted to strip such sheet of paper from said duplicating film.

8. In a duplicator, the combination with a frame having a bed, and a duplicating film thereon; of a carriage slidably mounted on said frame, said carriage comprising rocking members, means borne by said rocking members adapted to depress a sheet of paper or the like on to said duplicating film, means borne by said rocking members adapted to strip such sheet of paper from said duplicating film, and a stop rigidly secured to said carriage and adapted to limit the longitudinal movement of said paper.

9. In a duplicator, the combination with a frame having a bed, and a duplicating film thereon; of a carriage slidably mounted on said frame and provided with a stop rigidly secured thereto and adapted to limit the longitudinal movement of a sheet of paper; means adapted to depress such sheet of paper on to said duplicating film; means adapted to strip such sheet of paper from said duplicating film; and an adjustable stop on said frame adapted to limit the movement of said carriage.

10. In a duplicator, the combination with a frame having a bed, and a duplicating film thereon; of a carriage slidably mounted on said frame and provided with means adapted to depress a sheet of paper on to said duplicating film; means adapted to strip such sheet of paper from said duplicating film; and an adjustable stop on said frame adapted to limit the movement of said carriage; said adjustable stop comprising a sleeve revolubly and slidably mounted on said frame, a set-screw in said sleeve, an arm on said sleeve, and a rack on said frame adapted to engage with said arm.

11. In a duplicator, the combination with a frame having a bed, and a duplicating film thereon; of a carriage slidably mounted on said frame and provided with a stop rigidly secured thereto and adapted to limit the longitudinal movement of a sheet of paper; means adapted to depress such sheet of paper on to said duplicating film; means adapted to strip such sheet of paper from said film; and means adapted to elevate an edge of such sheet of paper whereby it may be engaged by said stripping means.

12. In a duplicator, the combination with a frame having a bed, and a duplicating film thereon; of a carriage slidably mounted on said frame and provided with a stop rigidly secured thereto and adapted to limit the longitudinal movement of a sheet of paper, means adapted to depress a sheet of paper on to said duplicating film; means adapted to strip such sheet of paper from said film; and means adapted to elevate an edge of such sheet of paper whereby it may be engaged by said stripping means; said elevating means being adapted to be operated by said carriage as it comes to the end of its movement over said bed.

13. In a duplicator, the combination with a frame having a bed, and a duplicating film thereon; of a carriage slidably mounted on said frame and provided with means adapted to depress a sheet of paper on to said duplicating film; means adapted to strip such sheet of paper from said film; and means adapted to elevate an edge of such sheet of paper whereby it may be engaged by said stripping means; said means comprising an arm pivotally secured to said frame, a second arm pivotally secured to said frame and provided with an elevating member, said arms being rigidly attached to each other, and a roller on said carriage adapted to depress said first named arm.

14. In a duplicator, the combination with a frame having a bed, and a duplicating film thereon; of a carriage slidably mounted on said frame and provided with a stop rigidly secured thereto and adapted to limit the longitudinal movement of a sheet of paper; means adaped to depress such sheet of paper on to said duplicating film; means adapted to strip such sheet of paper from such film; means adapted to elevate an edge of such sheet of paper, and an adjustable stop on said frame adapted to limit the movement of said carriage.

15. In a duplicator, the combination with a frame provided with a rack and having a bed, and a duplicating film on said bed; of a rocking frame slidably mounted on said frame; a roller journaled in said rocking frame adapted to depress a sheet of paper on to said duplicating film; a pair of rollers journaled in said rocking frame adapted to strip such sheet of paper from said film, one of said stripping rollers being provided with a gear wheel; and a second gear wheel journaled in said rocking frame at the point where it is pivotally secured to said carriage, and adapted to engage with said rack and with the gear wheel on said stripping roller.

16. In a duplicator, the combination with a frame provided with a rack and having a bed, and a duplicating film on said bed; of a rocking frame slidably mounted on said frame; a roller journaled in said rocking frame adapted to depress a sheet of paper on to said duplicating film; a pair of rollers journaled in said rocking frame adapted to strip such sheet of paper from said film, one of said stripping rollers being provided with a gear wheel; and a second gear wheel journaled in said rocking frame at the point where it is pivotally secured to said carriage, and adapted to engage with said rack and with the gear wheel on said stripping roller; said second gear wheel having a crank rigidly secured thereto, whereby said gear wheel may be rotated and said carriage moved.

17. In a duplicator, the combination with a frame provided with a rack and having a bed, and a duplicating film on said bed; of a rocking frame slidably mounted on said frame; a paper stop on said rocking frame; a roller journaled in said rocking frame adapted to depress a sheet of paper on to said duplicating film; a pair of rollers journaled in said rocking frame adapted to strip such sheet of paper from said film, one of said stripping rollers being provided with a gear wheel; and a second gear journaled in said rocking frame at the point where it is pivotally secured to said carriage, and adapted to engage with said rack and with the gear wheel on said stripping roller.

18. In a duplicator, the combination with a frame having a bed, and a duplicating film thereon; of a carriage slidably mounted on said frame and provided with an extension adapted to support a sheet of paper or the like, with a stop rigidly secured to said carriage and adapted to limit the movement of said paper longitudinally and said carriage being also provided with means adapted to depress said sheet of paper or the like on to said duplicating film.

19. In a duplicator, the combination with a frame having a bed, and a duplicating film thereon; of a carriage slidably mounted on said frame and provided with an extension adapted to support a sheet of paper or the like, with a stop rigidly secured to said carriage and adapted to limit the movement of said paper longitudinally and said carriage being also provided with means adapted to depress a sheet of paper or the like on to said duplicating medium and to be raised above said bed, thereby leaving a space into which may be inserted the end of such sheet of paper.

20. In a duplicator, the combination with a frame having a bed, and a duplicating film thereon; of a carriage slidably mounted on said frame, said carriage comprising rocking members, an extension adapted to support a sheet of paper or the like on said carriage, a stop rigidly secured to said carriage and adapted to limit the movement of said paper longitudinally, and means borne by said carriage adapted to depress a sheet of paper or the like on to said duplicating film.

21. In a duplicator, the combination with a frame having a bed, and a duplicating film thereon; of a carriage slidably mounted on said frame and provided with an extension adapted to support a sheet of paper or the like, with a stop rigidly secured to said carriage and adapted to limit the movement of said paper longitudinally, and an adjustable stop on said frame adapted to limit the movement of said carriage.

22. In a duplicator, the combination with a frame having a bed, and a duplicating film thereon; of a carriage slidably mounted on said frame and provided with means adapted to depress a sheet of paper or the like on to said duplicating film, and a pair of rollers adapted to strip said paper from said duplicating film.

23. In a duplicator, the combination with a frame having a bed, and a duplicating film thereon; of a carriage slidably mounted on said frame; and provided with means adapted to depress a sheet of paper or the like on to said duplicating film and to be raised above said bed, thereby leaving a space into which may be inserted the end of such sheet of paper, and a pair of rollers adapted to strip said paper from said film.

24. In a duplicator, the combination with a frame having a bed, and a duplicating film thereon; of a carriage slidably mounted on said frame, said carriage comprising rocking members, means borne by said carriage adapted to depress a sheet of paper or the like on to said duplicating film; and a pair of rollers adapted to strip said paper from said film.

25. In a duplicator, the combination with a frame having a bed, and a duplicating film thereon; of a carriage slidably mounted on said frame and provided with means adapted to depress a sheet of paper on to said duplicating film; a pair of rollers adapted to strip said paper from said film, and an adjustable stop on said frame adapted to limit the movement of said carriage.

26. In a duplicator, the combination with a frame having a bed, and a duplicating film thereon; of a carriage slidably mounted on said frame and provided with means adapted to depress a sheet of paper on to said duplicating film; a pair of rollers adapted to strip said paper from said duplicating film; and an adjustable stop on said frame, said adjustable stop comprising a sleeve, a rod, a set screw in said sleeve, and an arm on said sleeve adapted to engage with a rack on said frame.

27. In a duplicator, the combination with a frame having a bed, and a duplicating film thereon; of a carriage slidably mounted on said frame and provided with means adapted to depress a sheet of paper on to said duplicating film; a pair of rollers adapted to strip said paper from said film; and means adapted to elevate an edge of said paper, whereby it may be engaged by said stripping rollers.

28. In a duplicator, the combination with a frame having a bed, and a duplicating film thereon; of a carriage slidably mounted on said frame and provided with an extension adapted to support a sheet of paper or the like; means adapted to depress said sheet of paper on to said duplicating film; a pair of rollers adapted to strip said paper from said film; and means adapted to elevate an edge of such sheet of paper whereby it may be engaged by said stripping rollers; said elevating means being adapted to be operated by said carriage as it comes to the end of its stroke.

29. In a duplicator, the combination with a frame having a bed, and a duplicating film thereon; of a carriage slidably mounted on said frame; means adapted to depress a sheet of paper on to said duplicating film; a pair of rollers adapted to strip such sheet of paper from said film; and means adapted to elevate an edge of said sheet of paper whereby it may be engaged by said stripping rollers; said means comprising an arm pivotally secured to said frame, a second arm pivotally secured to said frame and provided with an elevating member, said arms being rigidly attached to each other, and means on said carriage adapted to depress said first named arm.

30. In a duplicator, the combination with a frame having a bed, and a duplicating film thereon; of a carriage slidably mounted on said frame; means adapted to depress a sheet of paper on to said duplicating film; a pair of rollers adapted to strip said sheet of paper from said film; means adapted to elevate an edge of such sheet of paper, and an adjustable stop on said frame adapted to limit the movement of said carriage.

31. In a duplicator, the combination with a frame provided with a bed, and a duplicating film on said bed; of a carriage slidably mounted on said frame and provided with an extension adapted to support a sheet of paper or the like; a frame secured to said carriage; a roller journaled in said last-mentioned frame adapted to depress such sheet of paper on to said duplicating film; and a pair of rollers journaled in said frame and adapted to strip such sheet of paper from said film.

32. In a duplicator, the combination with a frame provided with a bed, and a duplicating film on said bed; of a carriage slidably mounted on said frame; said carriage comprising a rocking frame; a roller journaled in said rocking frame adapted to depress a sheet of paper on to said duplicating film; and a pair of rollers journaled in said rocking frame adapted to strip such sheet of paper from said film.

33. In a duplicator, the combination with a frame provided with a rack and having a bed; and a duplicating film on said bed; of a carriage slidably mounted on said frame; said carriage comprising a frame; a roller journaled in said last named frame adapted to depress a sheet of paper on to said duplicating film; a pair of rollers journaled in said last named frame adapted to strip such sheet of paper from said film; one of said stripping rollers being provided with a gear wheel; and a second gear wheel mounted on said carriage and adapted to engage with said rack and with said first named gear wheel.

34. In a duplicator, the combination with a frame provided with a rack and having a bed, and a duplicating film on said bed; of a carriage slidably mounted on said frame; said carriage comprising a frame, a roller journaled in said last named frame adapted to depress a sheet of paper on to said duplicating film; a pair of rollers journaled in said last named frame adapted to strip such sheet of paper from said film, one of said stripping rollers being provided with a gear wheel; and a second gear wheel mounted on said carriage and adapted to engage with said rack and with said first named gear wheel, said second gear wheel having a crank rigidly secured thereto, whereby said gear wheel may be rotated and said carriage moved.

35. In a duplicator, the combination with a frame provided with a bed, and a duplicating film on said bed; of a carriage slidably mounted on said frame, said carriage comprising a frame, a paper-stop on said last mentioned frame, a roller journaled in said last mentioned frame adapted to depress a sheet of paper on to said duplicating film; and a pair of rollers journaled in said last mentioned frame and adapted to strip such sheet of paper from said film.

36. In a duplicator, the combination with a frame provided with a bed, and a duplicating film on said bed; of a carriage slidably mounted on said frame; said carriage comprising a rocking frame, a paper stop on said carriage, a roller journaled in said last named frame adapted to depress a sheet of paper on to said duplicating film; and a pair of rollers journaled in said last named frame adapted to strip such sheet of paper from said film.

37. In a duplicator, the combination with a frame provided with a rack and having a bed, and a duplicating film on said bed; of a carriage slidably mounted on said frame; said carriage comprising a frame, a paper stop on said carriage, a roller journaled in said last mentioned frame adapted to depress a sheet of paper on to said duplicating film; a pair of rollers journaled in said last mentioned frame adapted to strip such sheet of paper from said film; one of said stripping rollers being provided with a gear wheel, and a second gear wheel mounted on said carriage and adapted to engage with said rack and with said first named gear wheel.

38. In a duplicator, the combination with a frame having a bed, and a duplicating film thereon; of a carriage slidably mounted on said frame; said carriage comprising a frame provided with an inwardly extending lug, a slotted plate secured to said lug, a member adapted to slide in said slot, a roller journaled in said member and adapted to depress a sheet of paper or the like on to said duplicating film, and a spring adapted to press against said member.

39. In a duplicator, the combination with a frame having a bed, and a duplicating film thereon; of a carriage slidably mounted on said frame; said carriage comprising a frame provided with an inwardly extending lug, a plate secured to said lug, a roller journaled in said plate and adapted to depress a sheet of paper or the like on to said duplicating film, and a pair of rollers journaled in said plate and adapted to strip said paper from said film.

40. In a duplicator, the combination with a frame having a bed, and a duplicating film thereon; of a carriage slidably mounted on said frame; said carriage comprising a frame provided with an inwardly extending lug, a slotted plate secured to said lug, a roller journaled in said plate and adapted to depress a sheet of paper or the like on to said duplicating film; a roller mounted in said plate and adapted to strip said paper from said film; a member adapted to slide in said slot, a second stripping roller journaled in said member, and a spring adapted to press against said member, whereby said second stripping roller is maintained in close contact with said first stripping roller.

41. In a duplicator, the combination with a frame having a bed, and a duplicating film thereon; of a carriage slidably mounted on said frame; of a roller slidably journaled in said carriage and adapted to depress a sheet of paper or the like on to said duplicating film, and a spring adapted to bear downward upon said roller; and a pair of rollers journaled in said carriage and adapted to strip said paper from said film, one of said rollers being journaled slidably and provided with a spring adapted to maintain it in contact with said first named stripping roller.

In witness whereof I have hereunto signed my name this 17th day of April 1915.

ALOIS B. SALIGER.